(12) United States Patent
Sutherland et al.

(10) Patent No.: US 10,802,294 B2
(45) Date of Patent: Oct. 13, 2020

(54) LIGHT TRANSMISSIVE REGIONS TO PASS LIGHT TO CAMERAS

(71) Applicant: HEWLETT-PACKARD DEVELOPMENT COMPANY, L.P., Spring, TX (US)

(72) Inventors: Timothy J. Sutherland, San Diego, CA (US); Philip Wright, Ottawa (CA)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/724,589

(22) Filed: Dec. 23, 2019

(65) Prior Publication Data

US 2020/0124871 A1 Apr. 23, 2020

Related U.S. Application Data

(63) Continuation of application No. 16/076,913, filed as application No. PCT/US2017/014912 on Jan. 25, 2017, now Pat. No. 10,534,191.

(51) Int. Cl.
| | |
|---|---|
| *G02B 30/35* | (2020.01) |
| *G02B 17/00* | (2006.01) |
| *H04N 13/332* | (2018.01) |
| *H04N 13/239* | (2018.01) |
| *H04N 13/271* | (2018.01) |

(Continued)

(52) U.S. Cl.
CPC ............. *G02B 30/35* (2020.01); *G02B 17/00* (2013.01); *H04N 13/239* (2018.05); *H04N 13/271* (2018.05); *H04N 13/332* (2018.05); *H04N 13/344* (2018.05); *G02B 27/0176* (2013.01);

(Continued)

(58) Field of Classification Search
CPC ...... G02B 30/35; G02B 17/00; H04N 13/332; H04N 13/271; H04N 13/344; H04N 13/239

See application file for complete search history.

(56) References Cited

U.S. PATENT DOCUMENTS

| | | | |
|---|---|---|---|
| 8,957,835 | B2 | 2/2015 | Hoellwarth |
| 2014/0043441 | A1 | 2/2014 | Borenstein |

(Continued)

FOREIGN PATENT DOCUMENTS

| | | |
|---|---|---|
| DE | 102015100680 A1 | 7/2016 |
| WO | WO-2016025962 A1 | 2/2016 |

(Continued)

OTHER PUBLICATIONS

Adi Robertson, Samsung says a new Gear VR is coming soon, and it's working on its own HoloLens, Dec. 16, 2016 (8 pages).

(Continued)

*Primary Examiner* — Mishawn N. Hunter
(74) *Attorney, Agent, or Firm* — Trop, Pruner & Hu P.C.

(57) ABSTRACT

In some examples, an apparatus includes a housing to removably attach to an electronic device that includes first and second cameras spaced apart by a first distance. The apparatus includes a first light transmissive region of the housing to align with the first camera, the first light transmissive region to pass light from an environment to the first camera. The apparatus further includes a second light transmissive region of the housing spaced apart from the first light transmissive region by a second distance different from the first distance, and a light conduit to pass the light from the environment through the second light transmissive region to the second camera.

15 Claims, 3 Drawing Sheets

(51) Int. Cl.
*H04N 13/344* (2018.01)
*G02B 27/01* (2006.01)

(52) U.S. Cl.
CPC .......... *G02B 2027/0138* (2013.01); *H04N 2213/001* (2013.01)

(56) References Cited

U.S. PATENT DOCUMENTS

| | | |
|---|---|---|
| 2014/0152531 A1 | 6/2014 | Murray et al. |
| 2015/0234189 A1 | 8/2015 | Lyons |
| 2015/0296317 A1 | 10/2015 | Park |
| 2015/0348327 A1 | 12/2015 | Zalewski |
| 2016/0209658 A1 | 7/2016 | Zalewski |
| 2016/0349509 A1 | 12/2016 | Lanier et al. |
| 2017/0295359 A1 | 10/2017 | Cabral |
| 2018/0288310 A1 | 10/2018 | Goldenberg |

FOREIGN PATENT DOCUMENTS

| | | |
|---|---|---|
| WO | WO-2016141054 A1 | 9/2016 |
| WO | WO-2016208849 A1 | 12/2016 |

OTHER PUBLICATIONS

Bischoff, Impression Pi, a VR Headset That Soared to Kickstarter Success, Bites Off More Than it Can Chew retrieved from the Internet < https://www.techinasia.com/impression-pi-vr-headset-soared-kickstarter-success-doomed-fail >, Apr. 9, 2015 (9 pages).

http://uploadvr.com/gear-vr-becomes-gear-ar-spectacle-app-officially-launches/ The Gear VR Adds AR Functionality with 'Spectacle,' Mar. 2016 (5 pages).

Nafarrete, J., What Apple's Dual Camera iPhone Means for Augmented Reality, < http://vrscout.com/news/apple-duel-camera-iphone-for-augmented-reality/ >, Sep. 7, 2016 (19 pages).

Phone with 2 Cameras Placed Eye Distance Apart Used to Create an Augmented Reality Headset . . . , https://www.reddit com/r/virtualreality/comments/4d0iqe/phone_with_2_cameras_placed_eye_distance_apart/ >, Apr. 2, 2016 (4 pages).

Wikipedia, Pokémon Go last updated Dec. 31, 2016 (40 pages).

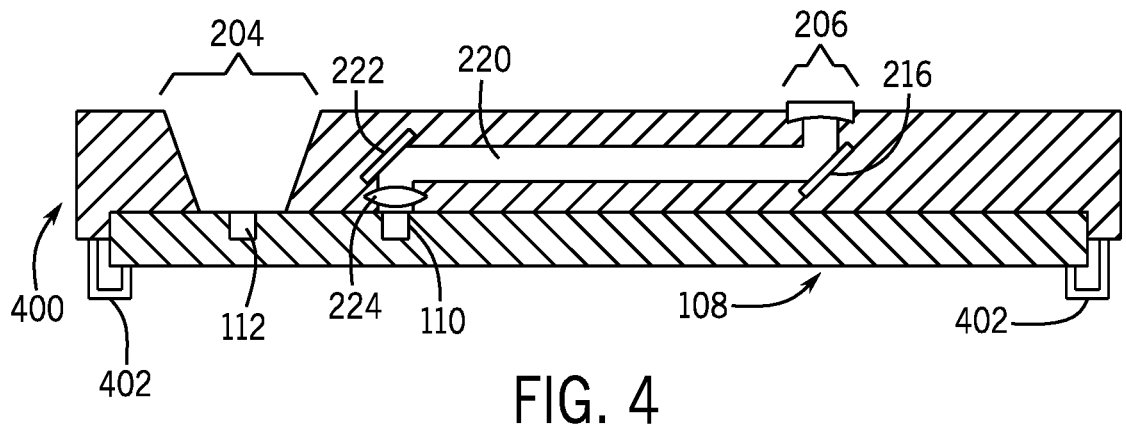

FIG. 4

| PROVIDE, IN AN ACCESSORY ATTACHABLE TO AN ELECTRONIC DEVICE, A FIRST LIGHT TRANSMISSIVE REGION AND A SECOND LIGHT TRANSMISSIVE REGION, THE FIRST LIGHT TRANSMISSIVE REGION TO ALIGN WITH A FIRST CAMERA OF THE ELECTRONIC DEVICE | —502 |

↓

| FORM A LIGHT CONDUIT IN THE ACCESSORY, WHERE A FIRST END OF THE LIGHT CONDUIT IS IN OPTICAL COMMUNICATION WITH THE SECOND LIGHT TRANSMISSIVE REGION, AND A SECOND END OF THE LIGHT CONDUIT ALIGNS WITH A SECOND CAMERA OF THE ELECTRONIC DEVICE, AND WHERE A DISTANCE BETWEEN THE FIRST AND SECOND LIGHT TRANSMISSIVE REGIONS IS GREATER THAN A DISTANCE BETWEEN THE FIRST AND SECOND CAMERAS | —504 |

FIG. 5

LIGHT TRANSMISSIVE REGIONS TO PASS LIGHT TO CAMERAS

CROSS REFERENCE TO RELATED APPLICATIONS

This is a continuation of U.S. application Ser. No. 16/076,913, having a national entry date of Aug. 9, 2018, which is a national stage application under 35 U.S.C. § 371 of PCT/US2017/014912, filed Jan. 25, 2017, which are both hereby incorporated by reference in their entirety.

BACKGROUND

Electronic devices can include cameras to capture images. For example, a handheld electronic device can include a camera on the rear surface of the handheld electronic device (the surface that is opposite a front surface and includes a display of the handheld electronic device) to capture an image that can be viewed by a user of the handheld electronic device on the display.

BRIEF DESCRIPTION OF THE DRAWINGS

Some implementations of the present disclosure are described with respect to the following figures.

FIG. 4 is a top view of an accessory including light transmissive regions according to further examples.

FIG. 5 is a flow diagram of a process of making an accessory according to some examples.

DETAILED DESCRIPTION

Figure 1:
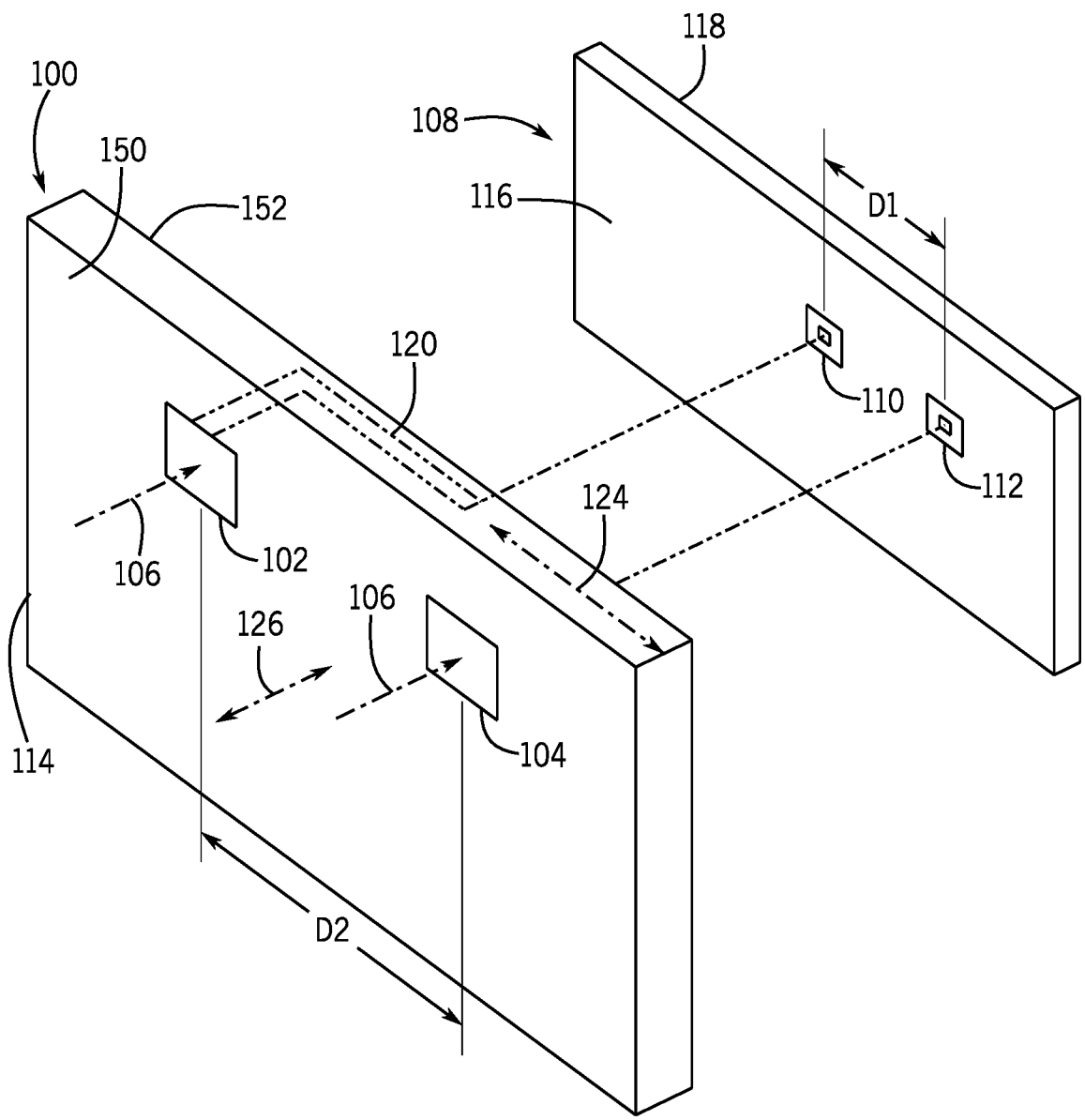
FIG. 1 is a perspective view of an arrangement including an accessory to removably attach to an electronic device, in accordance with some examples.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Head-mounted devices are devices that can be worn on a head of a user. In some examples, a head-mounted device can include a receptacle or other mounting mechanism to receive an electronic device that has a display, such as a handheld electronic device (e.g., a smartphone, a tablet computer, a game appliance, etc.). After the electronic device is mounted to the head-mounted device, a user can wear the head-mounted device, and the electronic device can be used to display an image that can be viewed by the user while wearing the head-mounted device. In some examples, the displayed image can include a virtual reality image. As used here, an "image" can refer to a still image or an image of a video.

A virtual reality image refers to an image that includes just virtual elements that are produced by machine-readable instructions executed by the electronic device. The virtual reality image is devoid of any images of physical real-world objects that actually exist in an outside environment that is external of the electronic device.

An augmented reality image refers to an image that includes both an image of a physical real-world object in an environment of the electronic device, and a virtual object that is generated by machine-readable instructions executed in the electronic device. An augmented reality representation provides a view of a physical, real-world environment where objects in the physical, real-world environment are augmented by computer-generated elements, including visual elements as well as audio elements, text information, and so forth. The image of the physical real-world environment can be captured by a camera of the electronic device, and the machine-readable instructions of the electronic device can then produce augmented information to add to the generated image of the physical real-world environment.

To be able to produce a three-dimensional (3D) augmented reality representation, multiple cameras with the appropriate spacing between the cameras can be provided on an electronic device. This spacing between the cameras should be sufficient to provide depth information, such that a 3D image can be produced of the captured physical real-world environment. Depth information refers to information relating to a depth of an object relative to a camera that has captured an image of the object, where the depth is the distance between the camera and the object. Although some electronic devices such as handheld electronic devices are provided with multiple cameras on the rear surface of the electronic device (the surface that is opposite the front surface that includes the display of the electronic device), such cameras do not have sufficient spacing between the cameras to enable effective production of a 3D augmented reality representation.

In accordance with some implementations of the present disclosure, as shown in FIG. 1, an accessory 100 includes light transmissive regions 102 and 104 that can receive light 106 from an environment. As used here, the term "environment" refers to a physical, real-world environment around an assembly that includes the accessory 100 and an electronic device 108, where the environment includes physical objects that are to be captured by cameras 110 and 112 of the electronic device 108. An "accessory" can refer to a device that is to be removably attached to an electronic device, such as the electronic device 108.

A light transmissive region can refer to a region formed in a housing 114 of the accessory 100 that allows light from the environment to pass from a first surface 150 of the housing 114 through the light transmissive region to a different part of the housing 114.

Each light transmissive region 102 or 104 formed in the housing 114 can include an opening in the housing 114. An opening refers to an aperture formed by removing material of the housing 114. Alternatively, each light transmissive region 102 or 104 can include an optical element that allows light to pass through the optical element. Examples of optical elements include any or some combination of the following: a transparent layer (e.g., a glass layer, a transparent plastic layer, etc.); a lens that can refract light; a light reflector such as a mirror to reflect light; or any other element through which light can pass. More generally, a light transmissive region can refer to any structure provided in the housing 114 of the accessory 100 through which the light 106 from the environment can pass.

The accessory 100 is removably attachable to the electronic device 108, such as by using a clip (or clips), an attachment mechanism that includes a post (or multiple posts) to be inserted into a receptacle (or multiple receptacles), or any other type of attachment mechanism. The electronic device 108 can include a handheld electronic device or any other electronic device that includes cameras 110 and 112 on a rear surface 116 of the electronic device 108, and a display (not shown) on a front surface 118 of the electronic device 108. The front surface 118 is opposite the rear surface 116 in that the front surface 118 faces in a first direction away from the electronic device 108 that is opposite of a second direction in which the rear surface 116 faces away from the electronic device 108. The cameras 110 and 112 can also be referred to as rear-facing cameras, since they face in a direction away from the display of the electronic device 108.

The cameras 110 and 112 are spaced apart by a distance D1. This distance D1 may not be sufficient to allow for effective generation of a 3D image using light captured by the cameras 110 and 112, since the small distance D1 may not provide sufficient depth perception. Generally, to provide sufficient depth perception, the cameras 110 and 112 should be spaced apart by a distance that more generally aligns with the eyes of a user.

To increase the effective distance between the cameras 110 and 112 (without actually physically separating the cameras 110 and 112 on the electronic device 108), the combination of the light transmissive regions 102 and 104 and a light conduit 120 that extends through the housing 114 of the accessory 100 can be provided. The light transmissive regions 102 and 104 are separated by a distance D2 that is greater than D1.

When the electronic device 108 is attached to the accessory 100, the camera 112 is aligned with the light transmissive region 104 such that the light 106 from the environment that passes through the light transmissive region 104 can pass directly to the camera 112 without having to bend the light. Bending light can refer to changing a direction of the light.

However, since the distance D2 between the light transmissive regions 102 and 104 is greater than the distance D1 between the cameras 110 and 112, the light 106 that is passed through the light transmissive region 102 cannot be directly passed to the camera 110. To allow for communication of the light 106 that passes through the light transmissive region 102 to the camera 110, the light conduit 120 is provided. Generally, the light conduit 120 is able to bend the light received through the light transmissive region 102 such that the light can be passed to the camera 110. For example, the light conduit 120 can include optical elements that receive the light through the light transmissive region 102, and cause the light to be propagated along an axis 124 that is angled with respect to an axis 126 along which the light 106 is received by the transmissive regions 102 and 104. The angle between the axis 124 and the axis 126 is a non-zero angle, such as a 90° angle or some other non-zero angle. The optical elements that can bend the light can include a light reflector and a lens, or multiple light reflectors and/or multiple lenses.

Although FIG. 1 shows the axis 126 as being perpendicular to the surface 150 of the housing 114 of the accessory 100, it is noted that light 106 can be received by the light transmissive regions 102 and 104 from the environment at different angles with respect to the surface 150.

In alternative examples, the light conduit 120 can include an optical fiber that can be routed through the housing 114 of the accessory 100 such that light received through the light transmissive region 102 can be bent to pass to the camera 110.

As shown in FIG. 1, the light transmissive region 104 of the accessory 100 is aligned with the camera 112 of the electronic device 108. A first end of the light conduit 120 is in optical communication with the light transmissive region 102, and a second end of the light conduit 120 exits a second surface 152 of the housing 114 of the accessory 100. The second end of the light conduit 120 is aligned with the camera 110 of the electronic device 108, so that light can pass from the second end of the light conduit 120 without bending.

Although FIG. 1 shows an example where the light transmissive region 104 is aligned with the camera 112 to allow light to be directly passed from the light transmissive region 104 to the camera 112 (without use of any light conduit to bend light), in alternative examples, the camera 112 does not have to be aligned with the light transmissive region 104. In such alternative examples, both the light transmissive regions 102 and 104 are not aligned with the cameras 110 and 112, such that a light conduit would also be provided for the light transmissive region 104 to bend light such that the light received through the light transmissive region 104 can pass to the camera 112.

Increasing the effective spacing between the cameras 110 and 112 (as compared to the actual distance D1 between the cameras 110 and 112) by using the combination of the light transmissive regions 102 and 104 and the light conduit 120 supports generation of a 3D augmented reality image, by the electronic device 108, using the cameras 110 and 112 of the electronic device 108. In some examples, the light transmissive regions 102 and 104 are approximately aligned with eyes of a user when the user views a display of the electronic device 108 that is attached to the accessory 100. The light transmissive regions 102 and 104 are "approximately aligned" with the eyes of a user if the left eye of the user is within a specified distance along the lateral axis 124, and the right eye of the user is within the specified distance of the light transmissive region 102 along the lateral axis 124.

Figure 2:
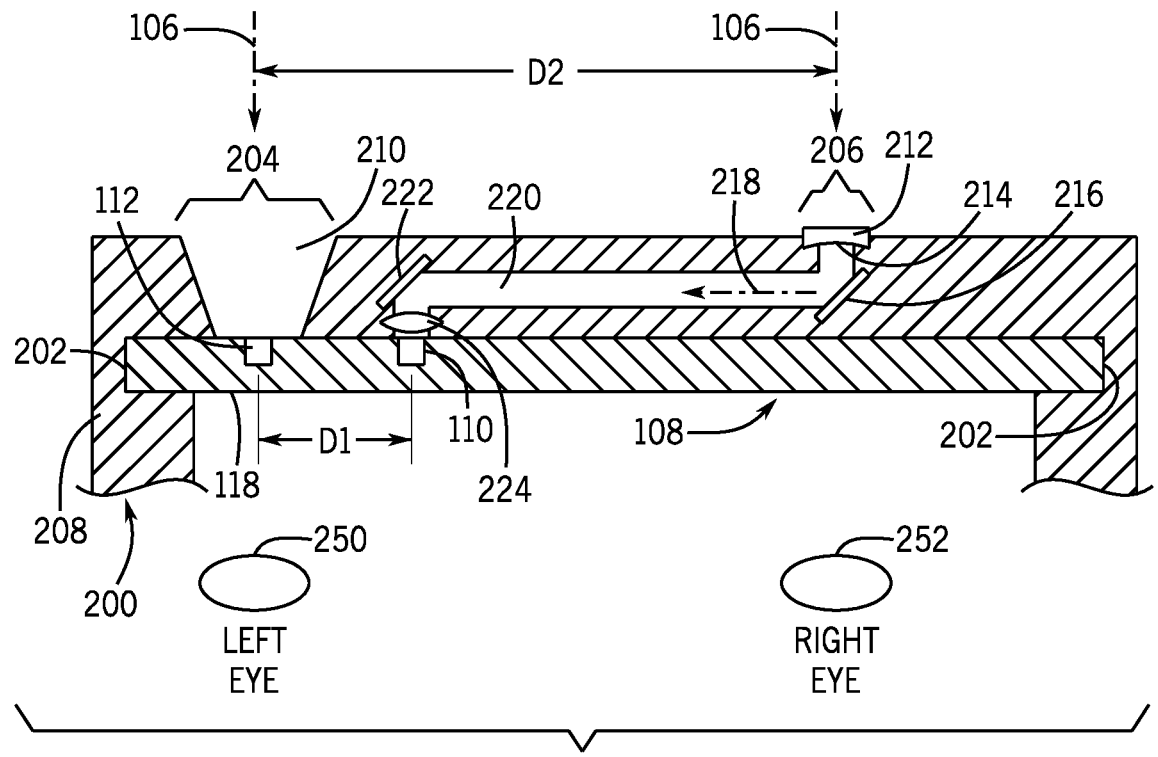
FIG. 2 is a top view of a head-mounted device that is removably attachable to an electronic device, where the head-mounted device includes light transmissive regions according to some examples.
Figure 3:
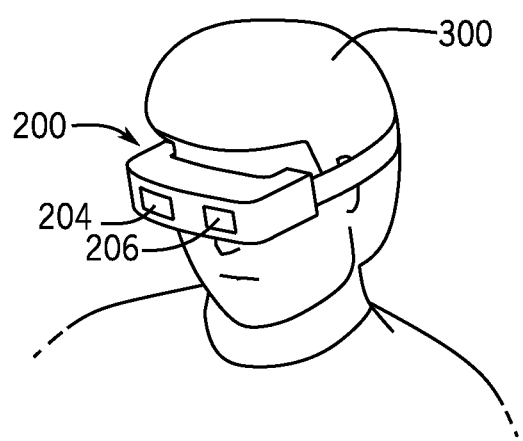
FIG. 3 illustrates a user wearing the head-mounted device according to some examples.

FIG. 2 is a top view of an accessory 200 that is attached to the electronic device 108. The accessory 200 of FIG. 2 is a head-mounted device that can be worn on a head 300 of a user, as shown in FIG. 3. The head-mounted device 200 includes a receptacle 202 to receive the electronic device 108. When the electronic device 108 is mounted in the receptacle 202 of the head-mounted device 200, and the head-mounted device 200 is worn on the user's head 300, the head-mounted device 200 covers the eyes of the user, such that the user's eyes (left eye 250 and right eye 252) can view a display on a front surface 118 of the electronic device 108.

The head-mounted device includes a light transmissive region 204 and a light transmissive region 206 that are spaced apart by a distance D2 that is greater than the distance D1 between the cameras 112 and 110 of the electronic device 108. In examples according to FIG. 2, the light transmissive region 204 includes an aperture 210 that is formed in the housing 208 of the head-mounted device 200. The aperture 210 allows light 106 from the environment to pass through the aperture 210 to the camera 112 of the electronic device 108.

In examples according to FIG. 2, the light transmissive region 206 of the accessory 200 includes a lens 212 that is mounted proximate an aperture formed in the housing 208 of the head-mounted device 200. The lens 212 includes a concave surface 214, which causes the light 106 from the environment to diverge after passing through the lens 212.

The lens 212 can also be considered to be part of a light conduit that is provided in the housing 208 of the head-mounted device 200 to pass light from the light transmissive region 206 to the camera 110 of the electronic device 108. The light conduit also includes a light reflector 216 to cause light to be reflected along a direction 218 in a light channel 220. The light in the light channel 220 along the direction 218 is again reflected by another light reflector 222, which causes the light to be reflected towards a lens 224. In some examples, the lens 224 can be a convex lens to focus light onto a focal point, which can correspond to a position of the camera 110 of the electronic device 108 when the electronic device 108 is mounted to the head-mounted device 200.

Although FIG. 2 shows a light conduit that includes optical elements 214, 216, 222, and 224, it is noted that in other examples, other combinations of optical elements can be employed. As in yet further examples, instead of using discrete optical elements, an optical fiber can be routed through the housing of the head-mounted device 200 to pass light from the light transmissive region 206 to the camera 110.

FIG. 4 is a top view of an accessory 400 according to further examples. Instead of being the head-mounted device 200 of FIG. 2, the accessory 400 can be an accessory that is removably attachable to the electronic device 108, such as by using clips 402 or other attachment mechanisms. With the accessory 400, the user can hold the assembly of the accessory 400 and the electronic device 108 (attached to the accessory 400) in a hand (or hands) of the user. The accessory 400 includes light transmissive regions 204 and 206 that can be arranged similarly as the corresponding light transmissive regions 204 and 206 of FIG. 2. Also, a light conduit similar to the light conduit shown in FIG. 2 can be used to pass light from the light transmissive region 206 to the camera 110 of the electronic device 108.

FIG. 5 is a flow diagram of a process of making an accessory (e.g., 100, 200, or 400) according to some examples. The process includes providing (at 502), in the accessory attachable to an electronic device, a first light transmissive region and a second light transmissive region, the first light transmissive region to align with a first camera of the electronic device. The process further includes forming (at 504) a light conduit in the accessory, where a first end of the light conduit is in optical communication with the second light transmissive region, and a second end of the light conduit aligns with a second camera of the electronic device. A distance between the first and second light transmissive regions is greater than a distance between the first and second cameras, to provide depth information in images acquired by the first and second cameras to enable generation, by the electronic device, of a three-dimensional (3D) augmented reality image based on the light received by the first and second cameras through the first and second light transmissive regions.

In use, an electronic device (e.g., the electronic device 108 shown in FIGS. 1, 2, and 4) can be attached to an accessory (e.g., the accessory 100, 200, or 400) that has a first light transmissive region and a second light transmissive region. A first camera of the electronic device receives light from an environment passed through the first light transmissive region. A second camera of the electronic device receives the light from the environment passed through the second light transmissive region, where a first distance between the first and second cameras is less than a second distance between the first and second light transmissive regions. The electronic device generates a 3D augmented reality image based on the light received by the first and second cameras through the first and second light transmissive regions.

The 3D augmented reality image includes an image of a physical object in the environment and a virtual object generated by machine-readable instructions executed in the electronic device.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
   a housing to removably attach to an electronic device comprising first and second cameras spaced apart by a first distance;
   a first light transmissive region of the housing to align with the first camera, the first light transmissive region to pass light from an environment to the first camera;
   a second light transmissive region of the housing spaced apart from the first light transmissive region by a second distance greater than the first distance; and
   a light conduit to pass the light from the environment through the second light transmissive region to the second camera.

2. The apparatus of claim 1, wherein a combination of the first and second light transmissive regions and the light conduit increases an effective spacing between the first and second cameras as compared to the first distance between the first and second cameras.

3. The apparatus of claim 2, wherein the first and second light transmissive regions are approximately aligned with eyes of a user when viewing a display of the electronic device attached to the housing.

4. The apparatus of claim 1, wherein the first and second light transmissive regions comprise respective first and second openings in the housing.

5. The apparatus of claim 1, wherein the first and second light transmissive regions comprise respective first and second optical elements in the housing.

6. The apparatus of claim 1, wherein the light conduit comprises a light reflector to direct the light from the environment and passed through the second light transmissive region along a direction that is angled with respect to a direction at which the light from the environment enters the second light transmissive region.

7. The apparatus of claim 6, wherein the light conduit further comprises a lens proximate the second light transmissive region, the lens to focus the light onto the light reflector.

8. The apparatus of claim 1, wherein the light conduit is to bend the light from the environment and passed through the second light transmissive region.

9. The apparatus of claim 1, comprising a head-mounted device comprising the housing, the head-mounted device to removably attach to the electronic device.

10. The apparatus of claim 1, comprising an accessory comprising the housing, the accessory to removably attach to the electronic device.

11. A method comprising:
    providing, in an accessory attachable to an electronic device, a first light transmissive region and a second light transmissive region, the first light transmissive region to align with a first camera of the electronic device; and
    forming a light conduit in the accessory, a first end of the light conduit in optical communication with the second light transmissive region, and a second end of the light conduit to align with a second camera of the electronic device, wherein a distance between the first and second light transmissive regions is greater than a distance between the first and second cameras, wherein a combination of the first and second light transmissive regions and the light conduit increases an effective spacing between the first and second cameras as compared to the distance between the first and second cameras.

12. The method of claim 11, further comprising arranging optical elements in the light conduit to bend light from an outside environment and that is passed through the second light transmissive region.

13. An accessory comprising:
   a housing to removably attach to an electronic device comprising first and second cameras spaced apart by a first distance;
   a first light transmissive region of the housing to align with the first camera, the first light transmissive region to pass light from an environment to the first camera;
   a second light transmissive region of the housing spaced apart from the first light transmissive region by a second distance greater than the first distance; and
   a light conduit to pass the light from the environment through the second light transmissive region to the second camera, the second light transmissive region to receive the light from the environment along a first direction, and the light conduit to propagate the light from the environment received through the second light transmissive region along a second direction angled with respect to the first direction, wherein the light conduit includes optical elements to bend light from the environment passed through the second light transmissive region.

14. The accessory of claim 13, wherein a combination of the first and second light transmissive regions and the light conduit increases an effective spacing between the first and second cameras as compared to the first distance between the first and second cameras.

15. The accessory of claim 13, wherein the optical elements comprise a lens and a reflector.

* * * * *